Patented Jan. 22, 1935

1,988,576

UNITED STATES PATENT OFFICE 1,988,576

COMPLEX COMPOUND OF PENTAVALENT ANTIMONY WITH AROMATIC POLYHYDROXY COMPOUNDS

Hans Schmidt, Elberfeld-Vohwinkel, Germany, assignor to Winthrop Chemical Company, Inc., New York, N. Y., a corporation of New York No Drawing. Application November 1, 1929, Serial No. 404,215. In Germany November 6, 1928

16 Claims. (Cl. 260—11)

The present invention relates to complex compounds of pentavalent antimony with aromatic polyhydroxy compounds and to a process of preparing the same.

According to my invention new complex compounds of pentavalent antimony with aromatic polyhydroxy compounds are prepared by causing antimonic acid or a water-soluble salt thereof to react upon an aromatic polyhydroxy compound containing at least two hydroxy groups in ortho-position to each other and being substituted by at least one acid group capable of forming a water-soluble salt, that is, a carboxylic acid or a sulfonic acid group, and which polyhydroxy compound may be otherwise substituted. Suitable aromatic acids coming into consideration for the purpose of the invention are, for example, pyrocatechin-mono- and -disulfonic acid, pyrogallol-mono- and -disulfonic acid, pyrocatechin-carboxylic acid, protocatechuic acid, gallic acid and the like. The quantities of the two components reacting upon each other may be varied within the widest limits, and the antimony content of the complex compound formed depends substantially on the relative proportion of the starting components used; generally I am working with about molecular quantities, but it is to be understood that the compounds obtainable by working with other proportions, for example, when reacting with about one molecular proportion of the antimony compound upon about two molecular proportions of an aromatic polyhydroxy compound of the above mentioned kind, are included within the scope of my invention.

The process is carried out by dissolving together in water the components and heating the reaction mixture preferably on a water bath for some hours. When starting with a water-soluble salt of an aromatic ortho-dihydroxy-carboxylic- or sulfonic-acid and a water-soluble antimonate, the complex compound is formed immediately after mixing together the components.

To obtain compounds having a neutral reaction in aqueous solution, it is very often necessary for the reaction to be carried out with the addition of an alkali. The term "alkali" may be conveniently used to designate both fixed and volatile alkalies, for instance, ammonia as well as amines and is used in that sense in the appended claims. Otherwise neutralization may be effected afterwards when the reaction is complete. The complex compounds are separated by evaporating the reaction mixture to dryness or by pouring the reaction mixture into an organic precipitant, such as acetone or methyl alcohol. They are obtained in the form of faintly colored powders, easily soluble in water, from which aqueous solution hydrogen sulfide precipitates antimony sulfide, and they are less toxic than the corresponding compounds containing antimony in the trivalent form as are described, for example, in U. S. Patent 1,549,154, dated August 11, 1925 when used for medical purposes.

The invention is illustrated by the following examples, without being limited thereto:

*Example 1.*—20 grams of potassium pyrocatechin disulfonate are dissolved in 100 ccm. of water and the solution is heated for a short time with an excess of antimonic acid (preferably in the freshly precipitated state). The mixture is allowed to cool, filtered from undissolved substances, the filtrate is neutralized with dilute caustic potash and precipitated by pouring into methyl alcohol. A whitish powder is obtained, readily soluble in water.

*Example 2.*—10 grams of diethylaminoethanol antimonate, obtainable, for example, by dissolving antimonic acid in diethylaminoethanol, filtering and evaporating, are dissolved in 15 ccm. of water and 14.5 grams of potassium pyrogallol disulfonate (see Beilstein, 4th edition, vol. XI, page 311, line 3 from the bottom) are likewise dissolved in 30 ccm. of water by heating. The two solutions are mixed, neutralized with dilute diethylaminoethanol solution and the solution is evaporated or the antimony complex salt formed is precipitated by pouring into methyl alcohol. The complex salt dissolves readily in water and the solution remains clear on addition of dilute acid or alkali. Hydrogen sulfide precipitates antimony sulfide slowly from an acidified solution. By altering the respective proportions in the example there can be obtained, for example, a complex salt possessing a lower antimony content.

*Example 3.*—A suspension of antimonic acid, freshly produced from 100 grams of antimony pentachloride, is added to a solution of 100 grams of sodium pyrogallol disulfonate in 300 ccm. of water. When heating the mixture thus prepared on the water bath a clear solution is soon obtained. After filtration from any turbidity present, dilute caustic soda solution is added until the solution is almost neutral, and then the solution is concentrated. The complex salt produced can be isolated, for example, by stirring the solution into methyl alcohol. After drying it is a faintly colored powder which readily dissolves in water.

In an analogous manner complex salts of pentavalent antimony with pyrocatechin disulfonic acid, pyrogallol disulfonic acid, pyrocatechin carboxylic acid, protocatechuic acid, alizarine sulfonic acids, gallic acid and the like are obtainable.

The present case describes and claims neutral complex pentavalent antimony pyrocatechin compounds as they have also been described in my earlier application Serial No. 254,893, filed February 16, 1928.

I claim:

1. In the process of preparing complex compounds of pentavalent antimony, the step which comprises reacting upon potassium pyrogallol disulfonate with diethylaminoethanolantimonate in the presence of water.

2. The process which comprises reacting upon potassium pyrogallol disulfonate with diethylaminoethanolantimonate in the presence of water and neutralizing the solution by the addition of an aqueous diethylaminoethanol solution.

3. The neutral complex organo-metallic compound of pentavalent antimony with pyrogallol disulfonic acid, said product being a faintly colored powder, soluble in water and displaying a therapeutic action.

4. In the process of preparing complex componds of pentavalent antimony, the step which comprises reacting upon potassium pyrocatechin disulfonate with antimonic acid in the presence of water.

5. In the process of preparing complex componds of pentavalent antimony, the step which comprises reacting upon sodium pyrogallol disulfonate with antimonic acid in the presence of water.

6. The process which comprises reacting upon potassium pyrocatechin disulfonate with antimonic acid in the presence of water and neutralizing the solution by the addition of dilute caustic potash solution.

7. The process which comprises reacting upon sodium pyrogallol disulfonate with antimonic acid in the presence of water and neutralizing the solution by the addition of dilute caustic soda solution.

8. In the process of preparing complex compounds of pentavalent antimony, the step which comprises reacting upon a polyhydroxy benzene compound selected from the group consisting of pyrogallol and pyrocatechine sulfonic and carboxylic acids, with an antimony compound selected from the group consisting of antimonic acid and a water-soluble antimonate, in the presence of water.

9. The process which comprises reacting upon a polyhydroxy benzene compound selected from the group consisting of pyrogallol and pyrocatechin sulfonic and carboxylic acids, with an antimony compound selected from the group consisting of antimonic acid and a water-soluble antimonate, in the presence of water, and neutralizing the solution by the addition of an alkali capable of forming a water-soluble product.

10. The neutral complex organo-metallic compounds of pentavalent antimony with a polyhydroxy benzene compound selected from the group consisting of pyrogallol and pyrocatechin, containing at least one acid group capable of forming a water-soluble salt, which acid group is attached to a basic radical of a water-soluble alkali, said products being generally faintly colored powders, soluble in water and displaying a therapeutic action.

11. The neutral complex organo-metallic compound of pentavalent antimony with pyrogallol disulfonic acid, in which compound the acid radicals are connected to potassium and diethylaminoethanol, said product being a faintly colored powder, soluble in water and displaying a therapeutic action.

12. The neutral complex organo-metallic compound of pentavalent antimony with pyrogallol disulfonic acid, in which compound the acid radicals are connected to sodium, said product being a faintly colored powder, soluble in water and displaying a therapeutic action.

13. The neutral complex organo-metallic compound of pentavalent antimony with pyrocatechin disulfonic acid, in which compound the acid radicals are connected to an alkali metal, said product being a whitish powder, soluble in water and displaying a therapeutic action.

14. The neutral complex organo-metallic compound of pentavalent antimony with pyrocatechin disulfonic acid, in which compound the acid radicals are connected to potassium, said product being a whitish powder, soluble in water and displaying a therapeutic action.

15. The neutral complex organo-metallic compounds of pentavalent antimony with a polyhydroxy benzene compound selected from the group consisting of pyrogallol and pyrocatechin sulfonic acids, in which the sulfonic acid groups are attached to a basic radical of a water-soluble alkali, said products being generally faintly colored powders, soluble in water and displaying a therapeutic action.

16. The neutral complex organo-metallic compounds of pentavalent antimony with a polyhydroxy benzene compound selected from the group consisting of pyrogallol and pyrocatechin carboxylic acids, in which the carboxylic acid groups are attached to a basic radical of a water-soluble alkali, said products being generally faintly colored powders, soluble in water and displaying a therapeutic action.

HANS SCHMIDT. [L. S.]